March 19, 1957 A. A. BITLE 2,786,110
WARNING DEVICE FOR BRAKE SYSTEMS
Filed Feb. 28, 1955
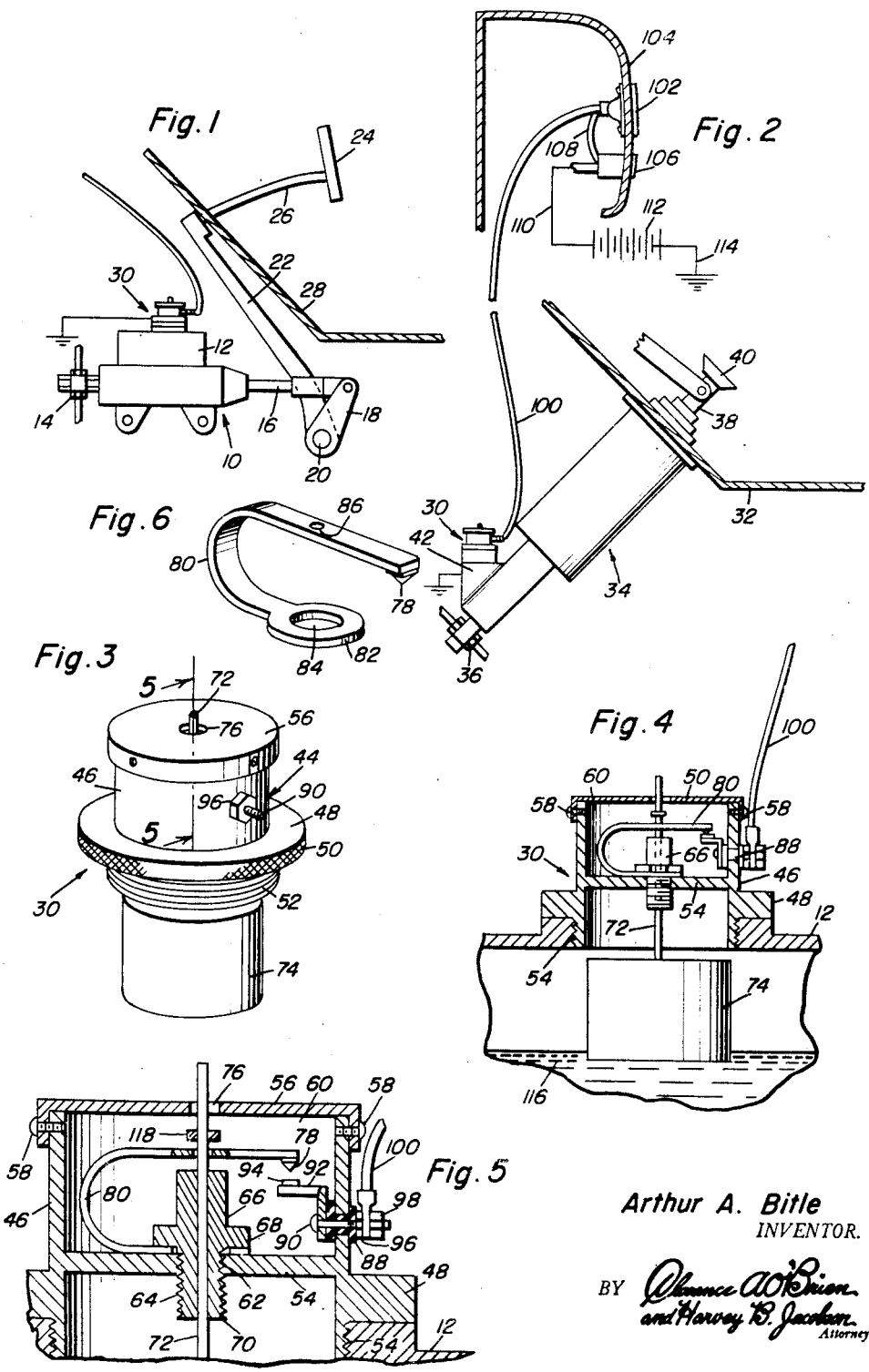
Arthur A. Bitle
INVENTOR.

United States Patent Office 2,786,110
Patented Mar. 19, 1957

2,786,110

WARNING DEVICE FOR BRAKE SYSTEMS

Arthur A. Bitle, Richmond, Calif.

Application February 28, 1955, Serial No. 490,948

3 Claims. (Cl. 200—84)

This invention relates in general to new and useful improvements in vehicle brake systems, and more specifically to an improved warning device or signal mechanism for indicating when a supply of brake fluid in a hydraulic master brake cylinder reservoir is dangerously low.

In all hydraulic systems for vehicle brakes there is provided a reservoir for the brake fluid. When the brake fluid becomes low in the reservoir, at times there becomes insufficient brake fluid to completely fill the brake lines when the brakes are applied with the result that improper brake action occurs. It is therefore highly desirable that the driver of the vehicle know when the hydraulic fluid supply is low so that he may properly replenish it.

It is therefore the primary object of this invention to provide an improved warning device for indicating a low hydraulic fluid supply, the warning device being adapted for use with conventional types of hydraulic brake mechanisms.

Another object of this invention is to provide an improved switch mechanism for indicating a low supply of hydraulic fluid in a master brake cylinder reservoir, the switch mechanism being in the form of a replacement filler cap so that it may be easily screwed in place and then connected to the desired electrical circuit.

A further object of this invention is to provide an improved warning system indicating a low supply of brake fluid for a hydraulic brake system, the warning system including a switch mechanism in the form of a replacement filler cap and a convenient electrical circuit including a warning light positioned on the instrument panel of an associated vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary sectional view taken through a vehicle and shows the master brake cylinder thereof together with the actuating leverage system for such master brake cylinder, the master brake cylinder being provided with the replacement filler cap switch mechanism which is the subject of this invention;

Figure 2 is a view similar to Figure 1 and shows the replacement filler cap being applied to a brake fluid reservoir of a power brake system, also being illustrated is the instrument panel of the associated vehicle together with the wiring system for the warning device;

Figure 3 is an enlarged perspective view of the replacement filler cap and shows the general details thereof;

Figure 4 is an enlarged fragmentary vertical sectional view taken through the upper portion of the reservoir of the master brake cylinder of Figure 1 and shows the general relationship of the mechanism of the replacement filler cap with respect to the hydraulic brake fluid supply in the reservoir;

Figure 5 is an enlarged fragmentary vertical sectional view taken substantially upon the plane indicated by the section line 5—5 of Figure 3 and shows the details of the switch mechanism of the filler cap; and Figure 6 is an enlarged perspective view of the movable contact of the switch mechanism.

Referring now to Figure 1, it will be seen that there is illustrated a conventional type of master brake cylinder which is referred to in general by the reference numeral 10. The master brake cylinder 10 includes a reservoir 12 which may be formed integral therewith. Connected to one end of the master brake cylinder 10 are suitable brake lines 14 and to the other end there is an operating plunger 16. The operating plunger 16 is attached to an arm 18 mounted on a shaft 20 which is rotated by a pedal arm 22 in response to the pressing of a brake pedal 24. The pedal arm 22 has an upper extension 26 on which the brake pedal 24 is mounted, the upper extension 26 passing through a floor board 28. Mounted in the reservoir 12 enclosing a filler opening thereof is the replacement filler cap, which is the subject of this invention, the filler cap being referred to by the reference numeral 30.

Referring now to Figure 2 in particular, it will be seen that there is illustrated a floor board 32 on the vehicle. Suitably mounted with respect to the floor board 32 is a conventional type power brake unit which is referred to in general by the reference numeral 34. The power brake unit 34 is provided at one end thereof with brake lines 36 and at the other end thereof with a plunger 38. Suitably connected to the plunger 38 is a brake pedal 40.

The power brake cylinder 34 also includes a reservoir 42. The reservoir 42 includes a conventional type of filler opening which has disposed therein the replaceable filler cap 30.

Referring now to Figures 3, 4 and 5 in particular, it will be seen that the filler cap 30 includes a housing which is referred to in general by the reference numeral 44. The housing 44 includes a generally cylindrical body portion 46 which is provided adjacent its lower end with an outwardly projecting annular collar 48. The periphery of the collar 48 is knurled as at 50 to facilitate the rotation of the housing 44. The lower part of the body portion 46 below the collar 48 is provided with suitable threads 52 which permit the filler cap 30 to be conveniently threaded into an internally threaded filler opening 54 of the reservoir 12 or a similar filler opening of the reservoir 42.

As is best illustrated in Figure 4, the body portion 46 is provided with a transverse partition wall 54 intermediate its height. Also, the upper end of the body portion 46 is closed by a cover 56 which is secured in place by suitable fasteners 58. These parts form in the upper part of the body portion 46 a switch chamber 60.

Referring now to Figure 5 in particular, it will be seen that the partition wall 54 is provided with a centrally located, internally threaded bore 62. Removably received in the bore 62 is a threaded lower portion 64 of a guide 66. The guide 66 is provided with a shoulder 68 to limit the threading of the lower portion 64 into the bore 62.

Extending through the guide 66 is a central boss 70 in which is guidingly received an intermediate portion of a float rod 72. Suspended at the lower end of the float rod 72 is a float 74. The float rod 72 is of a length to necessitate a central opening 76 in the cover 56 through which the upper part of the float rod 72 passes.

Referring now to Figure 6 in particular, it will be seen that there is illustrated a movable contact 78. The contact 78 is carried by a resilient arm 80 which is generally C-shaped in outline. The end of the arm 80 remote from the movable contact point 78 is enlarged as at 82 to be generally circular in outline. The enlarged portion of the arm 80 is provided with a bore 84 of a size to receive the threaded portion 64 of the guide 66. As is best illustrated in Figure 5, the arm 80 is clamped in place on the partition wall 54 by the collar 68 of the guide 66. The upper portion of the arm 80 is provided with a small bore 82 for receiving the upper portion of the float rod 72.

Fixed in the body portion 46 adjacent the movable contact point 78 is an insulating bushing 88. Passing through the bushing 88 is a terminal 90 which also is utilized to mount a bracket 92 carrying a fixed contact point 94. The opposite end of the terminal 90 is provided with a first nut 96 holding the terminal 90 in place, and a second nut 98 securing an end of a wire 100 to the terminal 90.

Referring now to Figure 2 in particular, it will be seen that the wire 100 is connected to a lamp 102 carried by an instrument panel 104 of an associated vehicle. The instrument panel 104 also carries a conventional ignition switch 106 which is electrically connected to the lamp 102 by a wire 108. Also connected to the ignition switch 106 is a wire 110 whose opposite end is connected to the vehicle battery 112. The battery 112 is grounded in a conventional manner by a wire 114. Inasmuch as the brake cylinder mechanism carrying the filler cap 30 is grounded to the vehicle frame or other supporting structure, it will be readily apparent that the circuit to the lamp 102 will be completed as soon as the contact points 78 and 94 are moved into engagement with each other.

In order that the contact point 78 may be moved downwardly into engagement with contact point 94 to indicate a low supply of hydraulic brake fluid 116 in the reservoir 12, the float rod 72 is provided above the arm 80 with a stop collar 118. The stop collar 118 engages the upper part of the arm 80 upon the lowering of the float 74 due to the lowering of the hydraulic brake fluid 116 in the reservoir 12. This will cause the arm 80 to move downwardly so that the contact point 78 will be pulled into engagement with contact point 94.

Inasmuch as the entire switch mechanism is in the form of a relatively simple replacement filler cap, it will be readily apparent that the warning circuit may be easily placed either in new cars or existing cars with a minimum of effort in changes.

The foregoing is considered as illustrative of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A switch mechanism for indicating a low brake fluid supply comprising a replacement filler cap for a reservoir of a master brake cylinder, said filler cap being hollow and having a top wall and a partition wall forming the switch chamber, a fixed contact point and a movable contact point mounted in said switch chamber in cooperating relation, one of said contact points being grounded, the other of said contact points being insulated, a float depending from said filler cap, a float rod guidingly carried by said partition wall, and a stop member on said float rod engageable with said movable contact point upon lowering of said float to move said movable contact point into engagement with said fixed contact point, said float rod extending through and above said top wall, whereby said float rod may be manually depressed to test the switch mechanism.

2. A switch mechanism for indicating a low brake fluid supply comprising a replacement filler cap for a reservoir of a master brake cylinder, said filler cap being hollow and having a top wall and a partition wall forming a switch chamber, a fixed contact point and a movable contact point mounted in said switch chamber in cooperating relation, one of said contact points being grounded, the other of said contacts being insulated, a float depending from said filler cap, a float rod guidingly carried by said partition wall, a stop member on said float rod engageable with said movable contact point upon lowering of said float to move said movable contact point into engagement with said fixed contact point, one of said contact points being pointed whereby a minimum of pressure on said movable contact point is required to complete a circuit between said contact points, said float rod extending through and above said top wall, whereby said float rod may be manually depressed to test the switch mechanism.

3. A switch mechanism for indicating a low brake fluid supply comprising a replacement filler cap for a reservoir of a master brake cylinder, said filler cap being hollow and having a partition wall forming a switch chamber, a fixed contact point and a movable contact point mounted in said switch chamber in cooperating relation, one of said contact points being grounded, the other of said contact points being insulated, a float depending from said filler cap, a float rod guidingly carried by said partition wall, and a stop member on said float rod engageable with said movable contact point upon lowering of said float to move said movable contact point engageable with said fixed contact point, one of said contact points being pointed whereby a minimum of pressure is required to complete an electrical circuit between said contact points.

References Cited in the file of this patent

UNITED STATES PATENTS

| | | |
|---|---|---|
| 1,497,712 | Crandall et al. | June 17, 1924 |
| 1,745,031 | Scott | Jan. 28, 1930 |
| 2,684,414 | Kilpatrick | July 20, 1954 |